(12) United States Patent
Brown

(10) Patent No.: US 8,579,584 B2
(45) Date of Patent: Nov. 12, 2013

(54) TURBOFAN JET ENGINE

(76) Inventor: Dewain Ray Brown, Roy, UT (US)

( * ) Notice: Subject to any disclaimer, the term of this patent is extended or adjusted under 35 U.S.C. 154(b) by 452 days.

(21) Appl. No.: 12/898,842

(22) Filed: Oct. 6, 2010

(65) Prior Publication Data

US 2012/0087787 A1    Apr. 12, 2012

(51) Int. Cl.
*F01D 9/00*    (2006.01)

(52) U.S. Cl.
USPC .......................................... 415/192; 415/220

(58) Field of Classification Search
USPC .......................................... 415/191, 192, 220
See application file for complete search history.

(56) References Cited

U.S. PATENT DOCUMENTS

| | | | |
|---|---|---|---|
| 1,075,994 A * | 10/1913 | Serramoglia et al. ......... | 415/191 |
| 1,892,303 A * | 12/1932 | Hagen ........................... | 415/191 |
| 4,055,041 A | 10/1977 | Adamson et al. | |
| 4,073,440 A | 2/1978 | Hapke | |
| 4,220,171 A | 9/1980 | Ruehr et al. | |
| 4,474,344 A | 10/1984 | Bennett | |
| 4,865,268 A | 9/1989 | Tracksdorf | |
| 5,085,048 A | 2/1992 | Kutschenreuter, Jr. et al. | |
| 5,156,362 A | 10/1992 | Leon | |
| 5,224,663 A | 7/1993 | Criswell | |
| 5,586,735 A | 12/1996 | Falempin et al. | |
| 5,660,038 A | 8/1997 | Stone | |
| 5,881,758 A | 3/1999 | Koncsek et al. | |
| 5,915,403 A | 6/1999 | McConachie et al. | |
| 6,079,667 A | 6/2000 | Gruensfelder | |
| 6,334,730 B1 * | 1/2002 | Porte ............................. | 403/104 |
| 6,708,711 B2 | 3/2004 | Surply et al. | |
| 6,793,175 B1 | 9/2004 | Sanders et al. | |
| 6,966,524 B2 | 11/2005 | Stuhr | |
| 7,207,520 B2 | 4/2007 | Lundy et al. | |
| 7,568,347 B2 | 8/2009 | Leland et al. | |
| 2011/0058929 A1 * | 3/2011 | Smith et al. .................... | 415/3.1 |

* cited by examiner

*Primary Examiner* — Edward Look
*Assistant Examiner* — Juan G Flores
(74) *Attorney, Agent, or Firm* — Webb IP Law Group; Jason P. Webb; Danny Y. H. Cheng

(57) ABSTRACT

There is a turbofan jet engine including an engine core. The engine core includes a fan and a compressor. The engine core includes a combustion chamber and a turbine functionally coupled to the compressor. The engine core includes a nozzle in fluid communication with the turbine. The turbofan jet engine includes a nacelle. The nacelle includes a forward extension proximate the fan and extending forward therefrom. The forward extension is funnel shaped to impart radial momentum to intake air during operation. The nacelle includes a vortex device disposed inside the forward extension and shaped to impart angular momentum to intake air. The vortex device includes a fixed blade extending from the interior of the forward extension and set at a rotational angle. The vortex device is shaped and positioned to direct intake air substantially perpendicular to the blades of the fan.

19 Claims, 10 Drawing Sheets

TURBOFAN JET ENGINE

BACKGROUND OF THE INVENTION

1. Field of the Invention

The present invention relates to jet engines, specifically to turbofan jet engine assemblies.

2. Description of the Related Art

A turbofan is a type of aircraft jet engine based around a gas turbine engine. Turbofans provide thrust using a combination of a ducted fan and a jet exhaust nozzle. Part of the airstream from the ducted fan passes through the core, providing oxygen to burn fuel to create power. However, the rest of the air flow bypasses the engine core and mixes with the faster stream from the core, significantly reducing exhaust noise. The rather slower bypass airflow produces thrust more efficiently than the high-speed air from the core, and this reduces the specific fuel consumption.

A few designs work slightly differently and have the fan blades as a radial extension of an aft-mounted low-pressure turbine unit. Turbofans have a net exhaust speed that is much lower than a turbojet. This makes them much more efficient at subsonic speeds than turbojets, and somewhat more efficient at supersonic speeds up to roughly Mach 1.6, but have also been found to be efficient when used with continuous afterburner at Mach 3 and above. However, the lower speed also reduces thrust at high speeds.

Some improvements have been made in the field. Examples of references related to the present invention are described below in their own words, and the supporting teachings of each reference are incorporated by reference herein:

U.S. Pat. No. 7,568,347, issued to Leland et al., discloses a diverterless hypersonic inlet (DHI) for a high speed, air-breathing propulsion system reduces the ingested boundary layer flow, drag, and weight, and maintains a high capture area for hypersonic applications. The design enables high vehicle fineness ratios, low-observable features, and enhances ramjet operability limits. The DHI is optimized for a particular design flight Mach number. A forebody segment generates and focuses a system of multiple upstream shock waves at desired strengths and angles to facilitate required inlet and engine airflow conditions. The forebody contour diverts boundary layer flow to the inlet sides, effectively reducing the thickness of the boundary layer that is ingested by the inlet, while maintaining the capture area required by the hypersonic propulsion system. The cowl assembly is shaped to integrate with the forebody shock system and the thinned boundary layer region.

U.S. Pat. No. 7,207,520, issued to Lundy et al., discloses an advanced aperture inlet (AAI) uses a three-dimensional, mixed compression inlet design derived from computational fluid dynamics (CFD) by streamline tracing a supersonic section from an axisymmetric mixed compression inlet solution. The axisymmetric design is used to obtain a CFD solution with slip wall boundaries at the inlet design point and serves as a flow field generator for the AAI. The AAI geometry is obtained by projecting a desired aperture shape onto a surface model of the external oblique shock. Streamline seeds are located on the projected aperture segments and transferred into the CFD solution space. The streamlines generated by these seeds inside the CFD solution space are then used as a wireframe to define the supersonic diffuser back to the throat location. Traditional design techniques are then used to define the subsonic diffuser from the inlet throat to the engine face.

U.S. Pat. No. 6,966,524, issued to Stuhr, discloses an engine nacelle for use with aircraft. In one embodiment, an engine nacelle includes an inlet having an inlet aperture and an outlet having an outlet aperture. In one aspect of this embodiment, the engine nacelle further includes a first side portion, a second side portion, and a third side portion. The first side portion can extend at least generally between a first edge portion of the inlet aperture and a third edge portion of the outlet aperture. The second side portion can be offset from the first side portion and extend at least generally between a second edge portion of the inlet aperture and a fourth edge portion of the outlet aperture to define a first interior portion. The third side portion can be offset from the second side portion and extend at least generally from the second edge portion of the inlet aperture toward the fourth edge portion of the outlet aperture to define a second interior portion. In another aspect of this embodiment, the first interior portion is configured to house an engine, and the second interior portion is configured to house a landing gear assembly.

U.S. Pat. No. 6,793,175, issued to Sanders et al., discloses a supersonic external-compression inlet comprises a generally scoop-shaped supersonic compression section for diffusing a supersonic free stream flow. The supersonic compression section includes a main wall having a leading edge and a throat portion downstream of the leading edge, and side portions joined to opposite side edges of the main wall so as to form a generally scoop-shaped structure. The side portions advantageously extend into the supersonic flow stream far enough to encompass the initial oblique shock wave that is attached to the leading edge of the main wall. The main wall has an inner surface formed generally as an angular sector of a surface of revolution, the inner surface of the main wall coacting with inner surfaces of the side portions to define a three-dimensional external-compression surface. The supersonic external-compression inlet also includes a subsonic diffuser section arranged to receive flow from the supersonic compression section and to diffuse the flow to a subsonic condition. A variable-geometry inlet includes an external ramp hinged about its forward edge and forming a portion of the inner surface of the scoop-shaped diffuser, pivotal movement of the external ramp serving to vary a throat size of the inlet. The subsonic diffuser includes an internal ramp hinged about its aft edge for maintaining a smooth transition from the external ramp.

U.S. Pat. No. 4,073,440, issued to Hapke, discloses a combination primary and fan air thrust reversal control systems for long duct fan jet engines are disclosed. In one form, the system spoils and expands primary air and, then, allows the spoiled, expanded air to exit from the fan air duct exhaust nozzle while directing fan air in a thrust reversal direction out cascade vanes circumferentially located in the aft portion of the engine nacelle. In other forms, the system directs unequal pressure fan air and primary air through separate thrust reversal ducting and out cascade vanes circumferentially located in the engine nacelle. In equal pressure fan air and primary air systems, the air may be mixed in ducting prior to being emitted from common cascade vanes, or may be maintained separate prior to emission. In still other forms, the primary air is pre-exhausted through separate nozzles located in the primary duct wall, and a portion is then exhausted through the nacelle cascade vanes. In all systems, circumferential cascade vanes are radially located in the rear portion of the engine nacelle and are exposed by rearwardly translating the aft portion of the nacelle, which forms the fan air duct exhaust nozzle. As the fan air duct exhaust nozzle is translated rearwardly, fan air duct blocker doors and, depending on the system, primary air duct blocker doors are positioned to divert the jets for thrust reversing. As an alternative to a primary air duct blocker door, the primary air duct exhaust nozzle is translated rearwardly to contact the exhaust cone or plug and, thereby, valve off the primary air duct. In this case, the fan and primary exhaust nozzles are translated rearwardly as unit.

The inventions heretofore known suffer from a number of disadvantages which include being inefficient, being limited in conversion, being ineffective, being limited in speed, being limited in performance, and being limited in adaptation.

What is needed is a turbofan jet engine that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available turbofan jet engine. Accordingly, the present invention has been developed to provide a more efficient turbofan jet engine.

According to one embodiment of the invention, there is a turbofan jet engine. The turbofan jet engine may include an engine core. The engine core may include a fan and a compressor in fluid communication with the fan. The engine core may include a combustion chamber in fluid communication with the compressor and a turbine in fluid communication with the combustion chamber and functionally coupled to the compressor. The engine core may include a nozzle in fluid communication with the turbine.

The turbofan jet engine may include a nacelle. The nacelle may include a forward extension proximate the fan and extending forward therefrom. The forward extension may be shaped to impart radial momentum to intake air during operation. The forward extension may be funnel shaped. The nacelle may include a vortex device disposed inside the forward extension and shaped to impart angular momentum to intake air. The vortex device may include a fixed blade extending from the interior of the forward extension and set at a rotational angle. The vortex device may include a twisted fin extending across the forward extension. The vortex device may include an air channel disposed through the forward extension and set at a rotational angle. The vortex device may be shaped and positioned to direct intake air substantially perpendicular to the blades of the fan.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
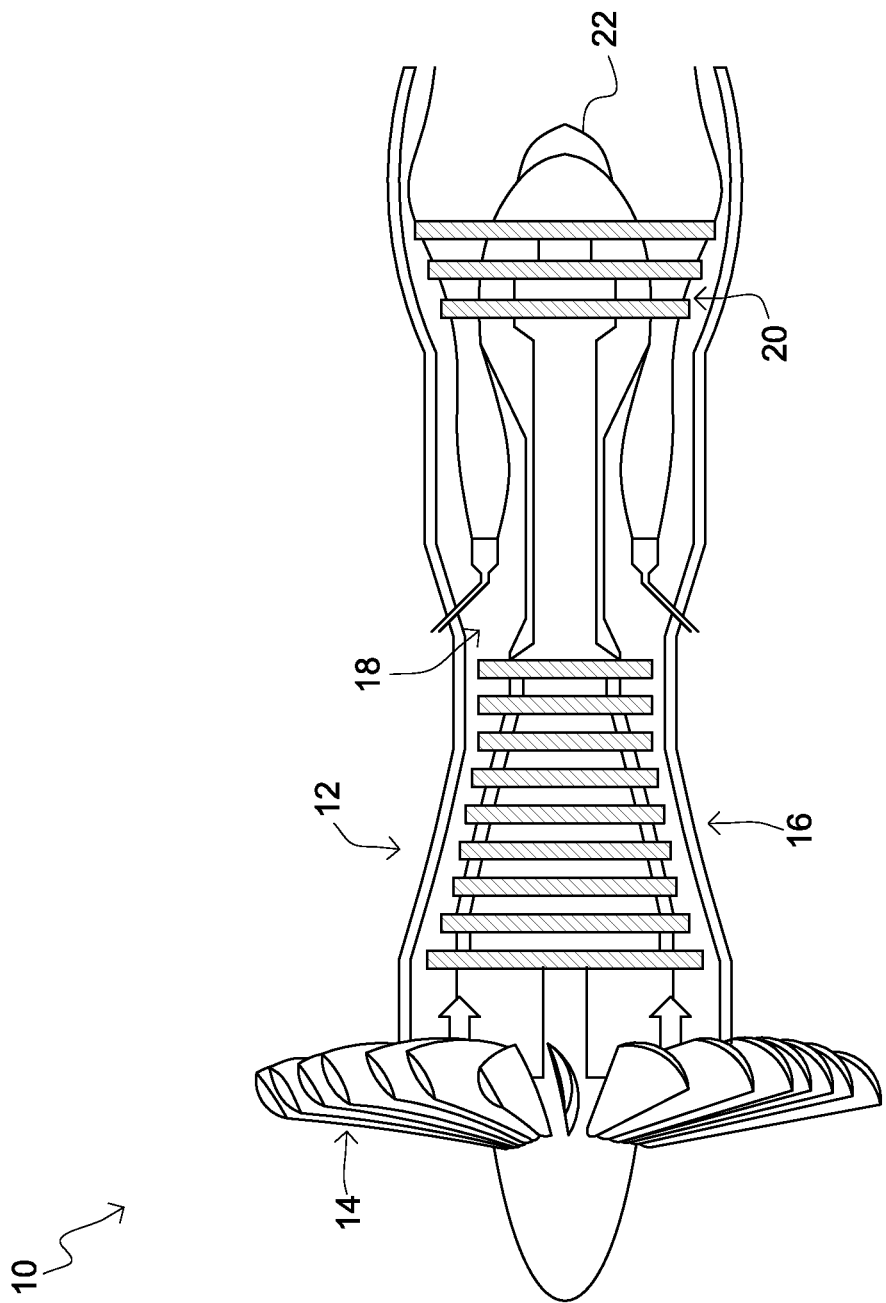
FIG. 1 is a side elevational view of a turbofan jet engine, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

As used herein, "vortex" is a spinning flow of fluid that may have substantially closed streamlines.

FIG. 1 is a side elevational view of a turbofan jet engine, according to one embodiment of the invention. There is shown a turbofan jet engine 10 including an engine core 12. The engine core includes a fan 14 and a compressor 16 in fluid communication with the fan 14. The engine core 12 includes a combustion chamber 18 in fluid communication with the compressor 16. The engine core 12 includes a turbine 20 in fluid communication with the combustion chamber 18 and functionally coupled to the compressor 16. The engine core 12 further includes a nozzle 22 in fluid communication with the turbine 20. The turbofan jet engine 10 is configured to provide a high exhaust velocity from a high pressure ratio of the fan 14 and intake air passing therethrough.

Figure 2:
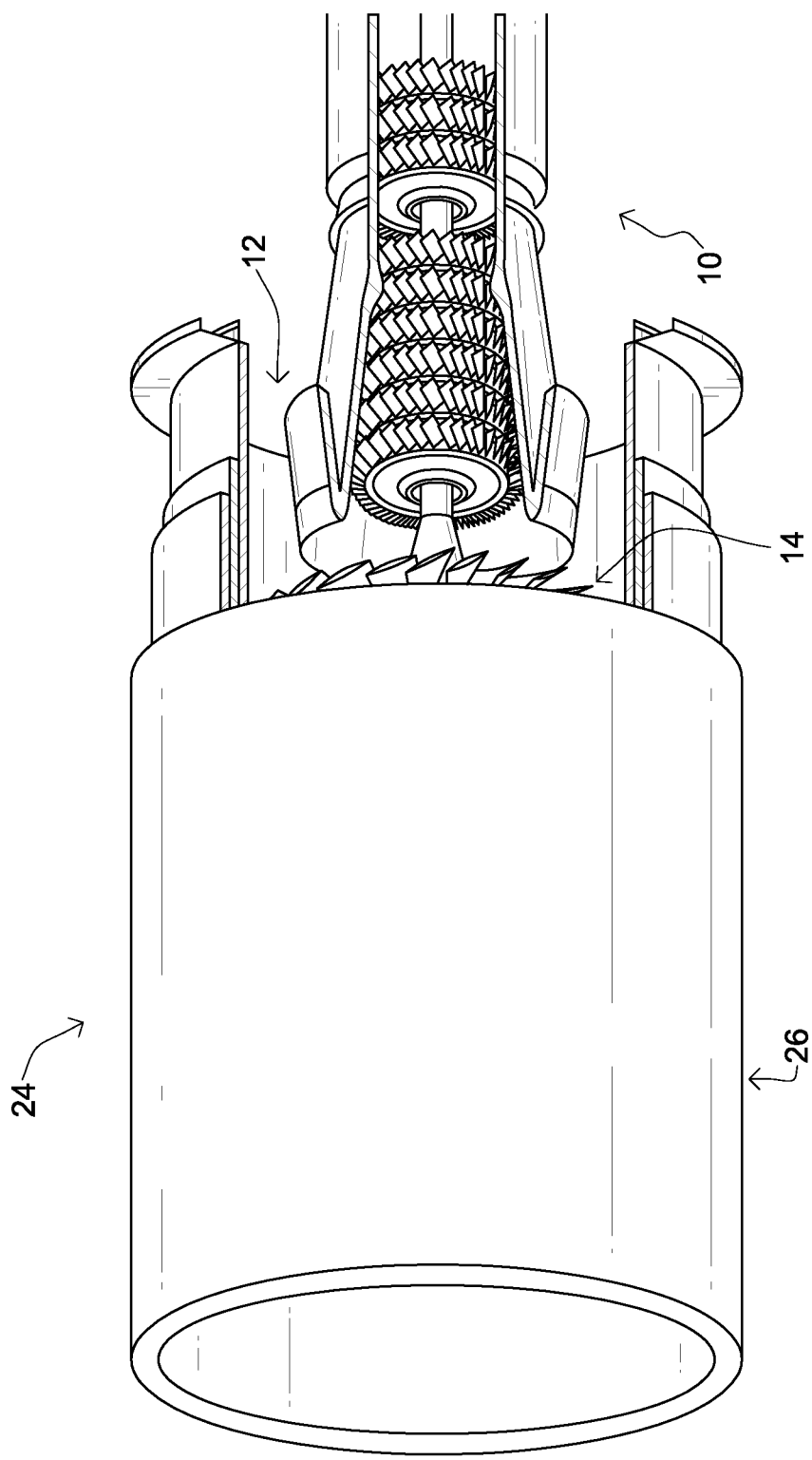
FIG. 2 is a side elevational view of a nacelle and a turbofan jet engine, according to one embodiment of the invention.

FIG. 2 is a side elevational view of a nacelle and a turbofan jet engine, according to one embodiment of the invention. There is shown a turbofan jet engine 10 comprising an engine core 12 and a nacelle 24 including a forward extension 26 proximate a fan 14 of the engine core 12 and extending forward therefrom. As illustrated in FIG. 2, the forward extension 26 of the nacelle 24 is substantially parallel in configuration and therefore in a cylinder-shape design.

Figure 3:
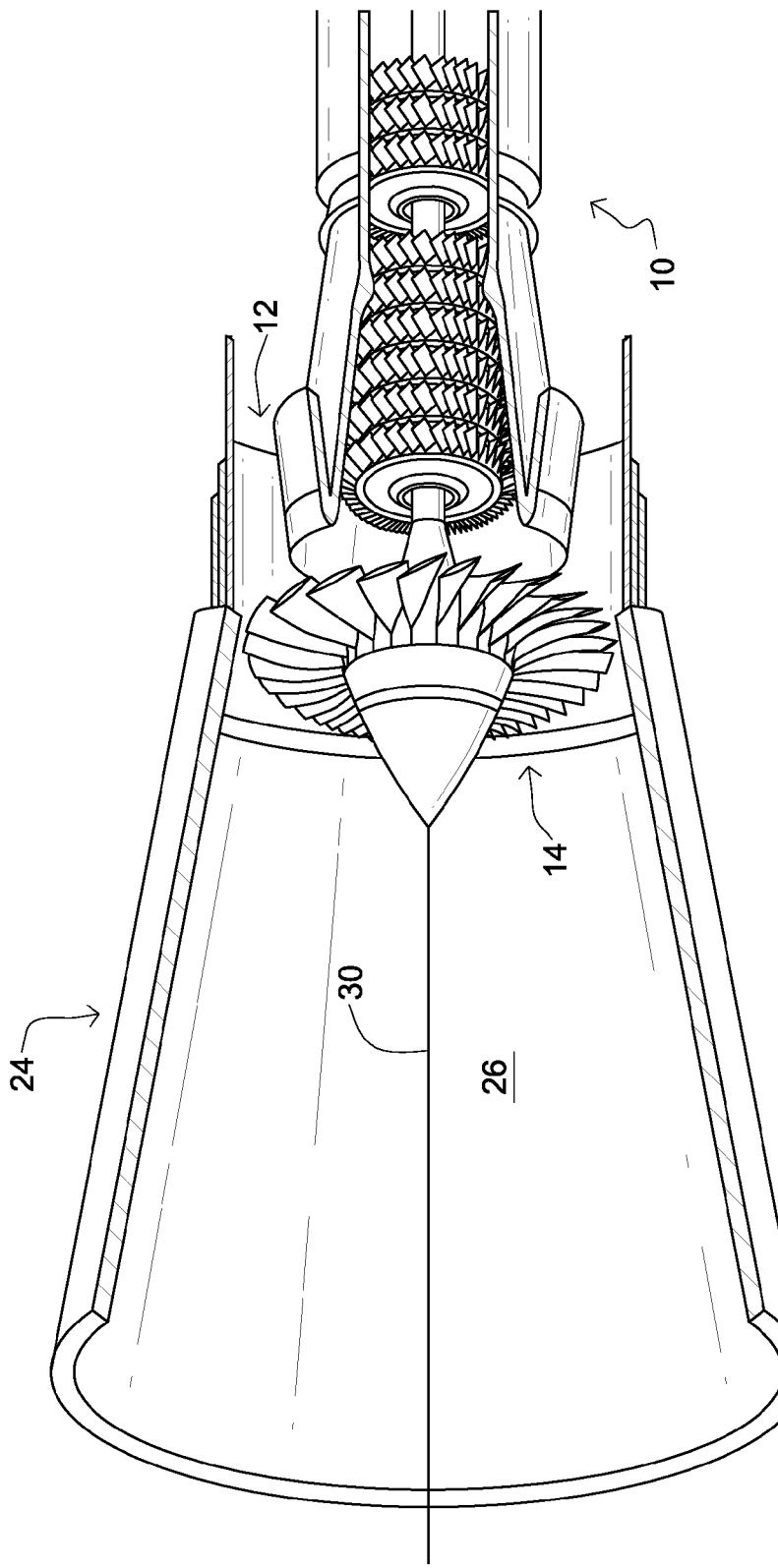
FIG. 3 is a cross-sectional view of a nacelle and a turbofan jet engine, according to one embodiment of the invention.

FIG. 3 is a cross-sectional view of a nacelle and a turbofan jet engine, according to one embodiment of the invention. There is shown a turbofan jet engine 10 including an engine core 12 and a nacelle 24. The nacelle includes a forward extension 26 proximate to a fan 14, of the engine core 12, and extending forward therefrom. The forward extension 26 is shaped to impart radial momentum to intake air during operation.

Radial and angular relationships herein, unless otherwise specifically stated, is defined herein to be measured from a major axis 30 substantially collinear with the center of the front of the engine and extending along the direction of intended flight. Accordingly, a radial momentum would be momentum having a component in a direction that changes a radial distance from such an axis. An angular momentum would be momentum having a component in a direction that would rotate/change an angular position about the major axis.

Where a nacelle imparts radial momentum to the intake air, the air is compressed as it approached the fan blades. The illustrated nacelle displays rotational symmetry and a continuous radial expansion/contraction along its length. Therefore it is shaped to impart radial momentum to the intake air at all angular positions about the nacelle interior surface and along its entire length. The illustrated nacelle is substantially funnel-shape in configuration. The illustrated funnel-shape configuration impacts the velocity and pressure of the intake air as intake air passes through the forward extension 26 and contacts the fan 14. The funnel-shaped forward extension compresses the intake air, thereby providing greater intake air pressure as the intake air passes through the engine core 12. The enhanced air pressure creates a higher exhaust velocity once the pressurized air is passes through the engine, which is associated with speed and efficiency of the engine. Further, the enhanced air pressure increases the density of the air passing around the engine (instead of through) and therefore increases the efficiency of the same.

The illustrated nacelle includes a front aperture and a rear aperture, wherein the front aperture has a higher cross-sectional surface than the rear aperture. Accordingly, air intake pressure is necessarily higher than the pressure of the air at the rear of the nacelle, which is substantially adjacent to the fan blades. The illustrated nacelle is frustoconical in shape. It is understood that a great variety of particular shaped nacelles may be employed that achieve one or more of the objectives of compressing the intake air, increasing the pressure of the air at the fan blades, and/or imparting radial momentum to the air. Such specific designs of nacelle that provides for enhanced air pressure at the fan blades are plethoric and may be adapted for suitability, size, and to take advantage of particular benefits. Further, there is room for further development of specifically shaped nacelles that may provide surprising benefits while still providing the benefits described herein and including the structure described herein.

Figure 4:
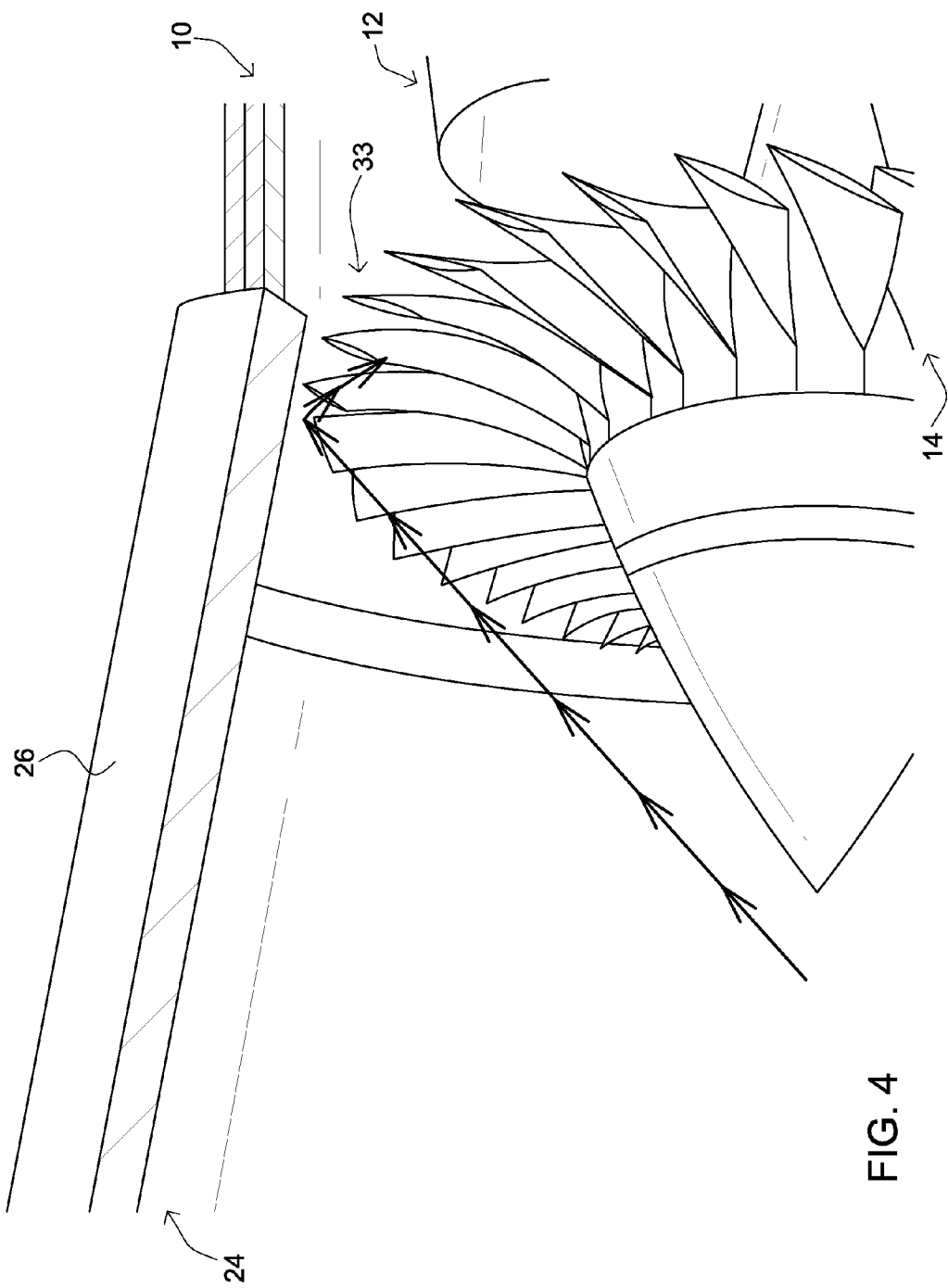
FIG. 4 is a side elevational view of an airstream contacting a fan blade of a turbofan jet engine, according to one embodiment of the invention.
Figure 5:
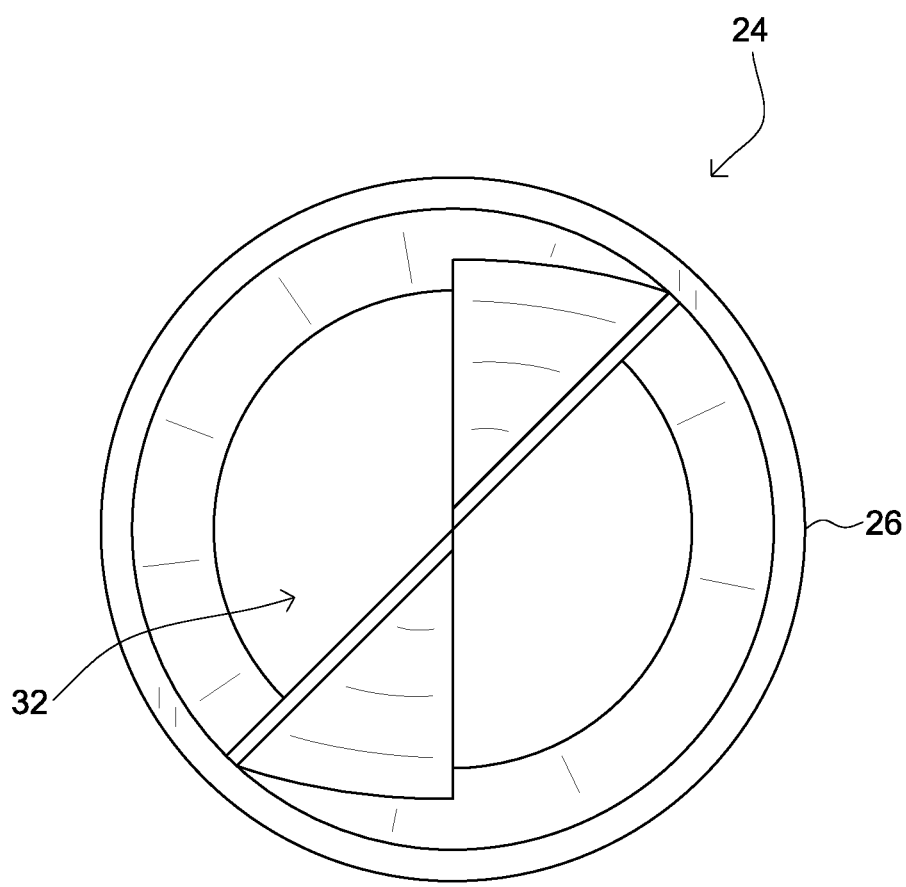
FIG. 5 is a front plan view of a nacelle of a turbofan jet engine, according to one embodiment of the invention.
Figure 6:
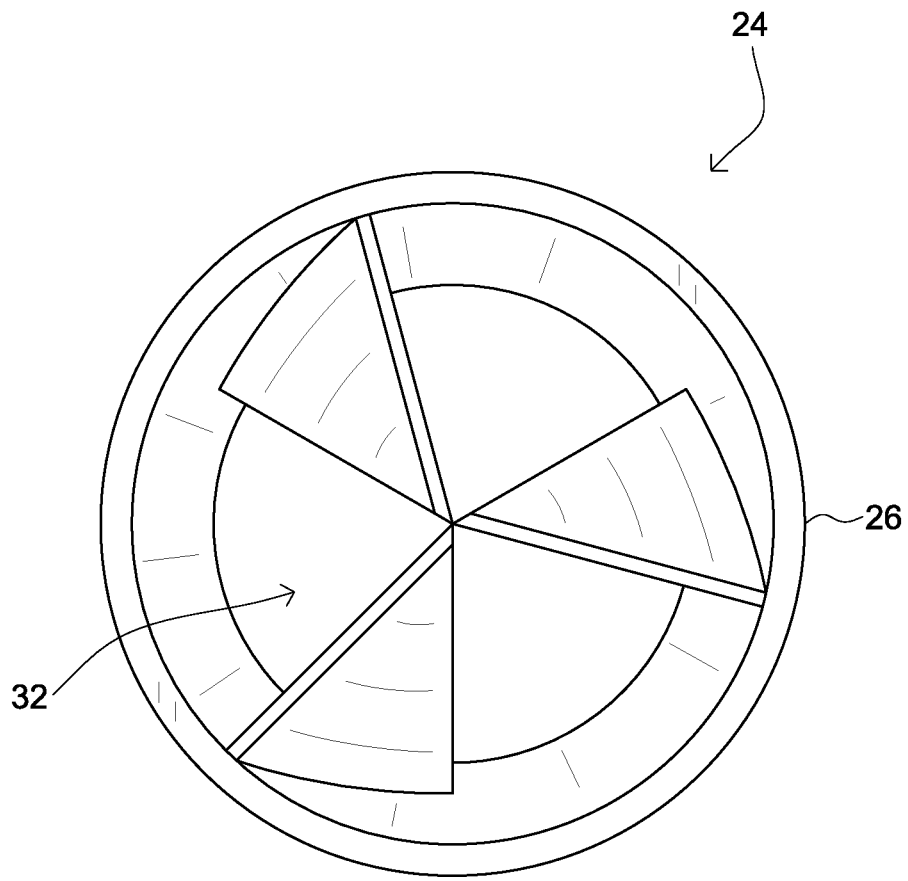
FIG. 6 is a front plan view of a nacelle of a turbofan jet engine, according to one embodiment of the invention.
Figure 7:
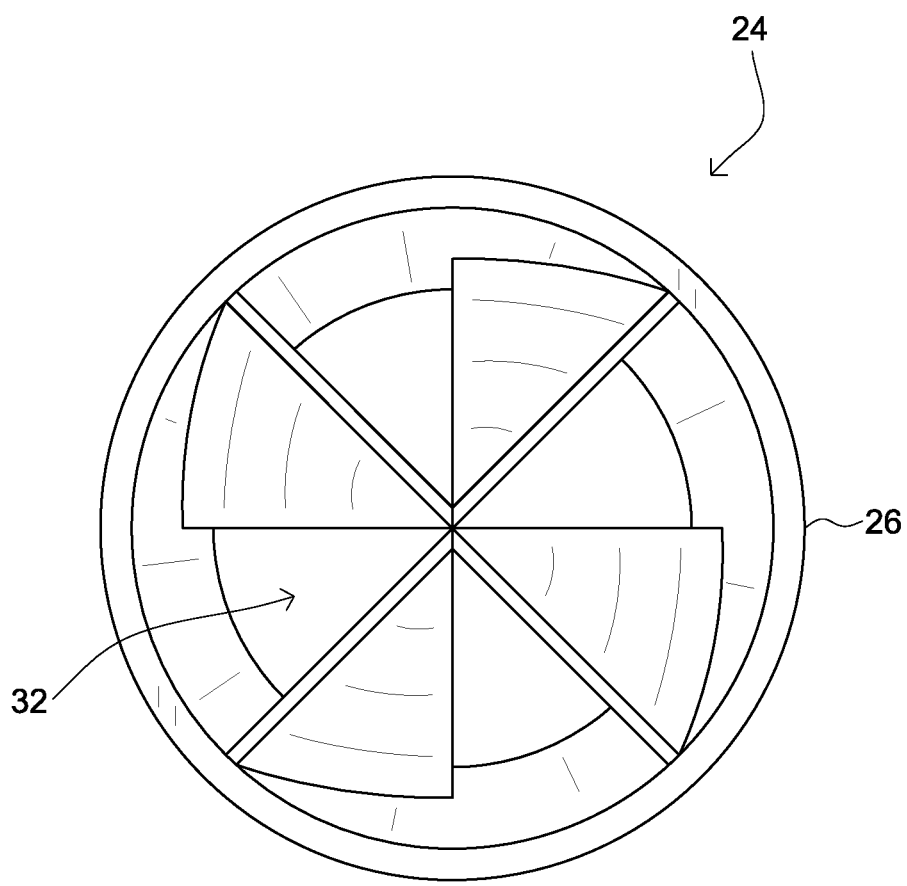
FIG. 7 is a front plan view of a nacelle of a turbofan jet engine, according to one embodiment of the invention.
Figure 8:
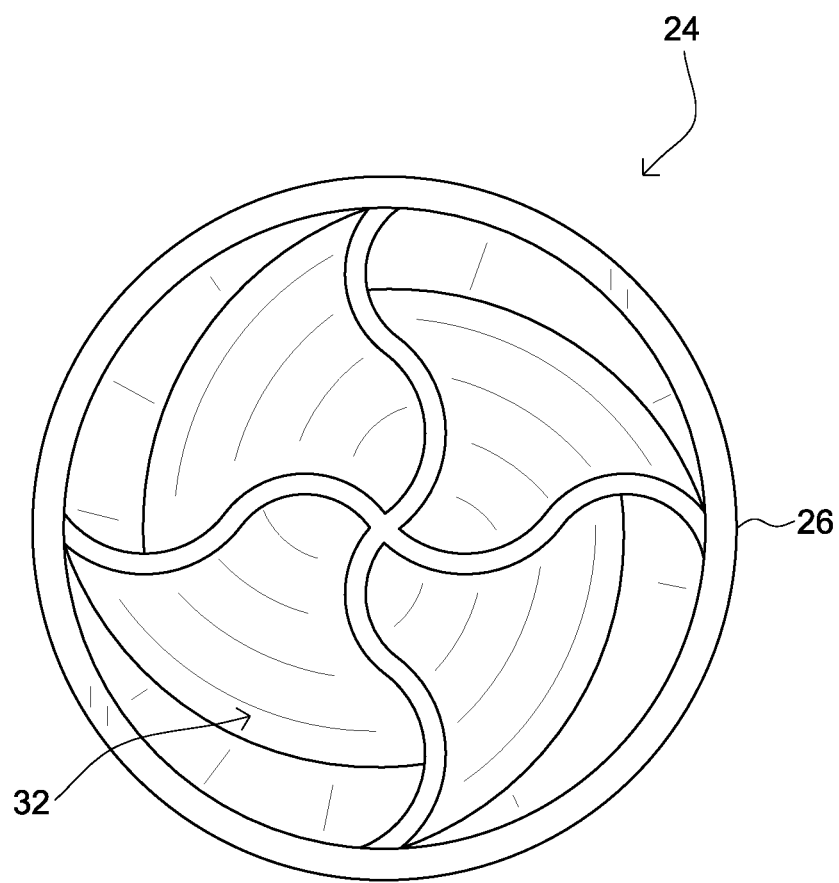
FIG. 8 is a front plan view of a nacelle of a turbofan jet engine, according to one embodiment of the invention.
Figure 9:
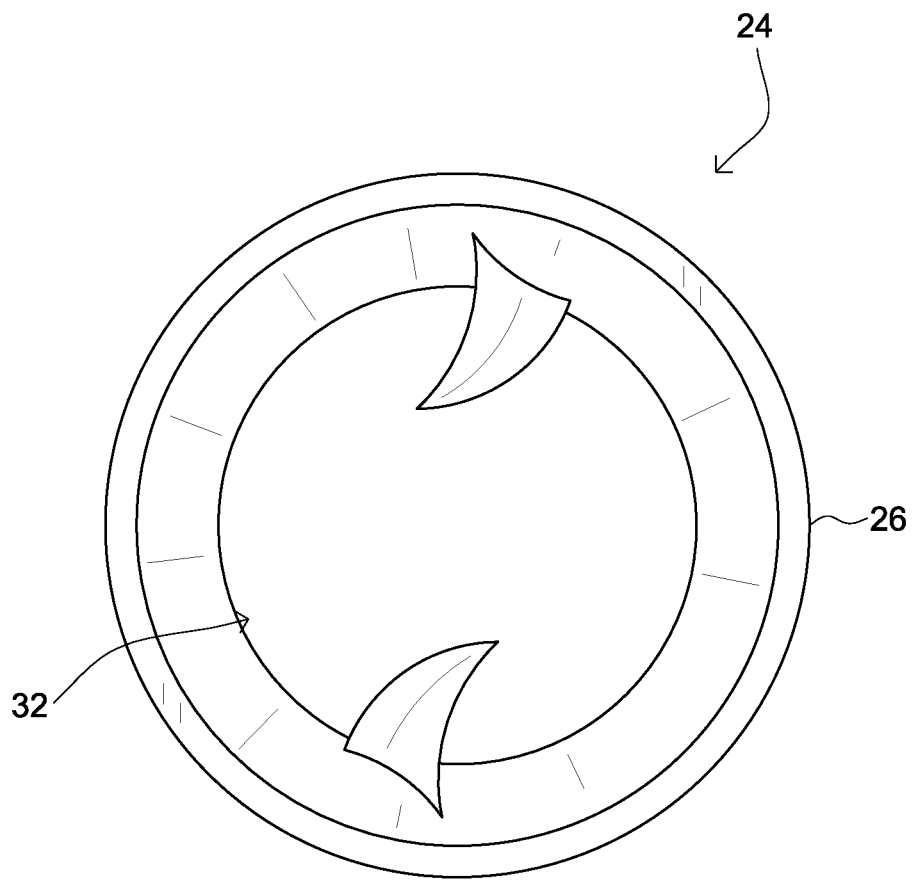
FIG. 9 is a front plan view of a nacelle of a trubofan jet engine, according to one embodiment of the invention.
Figure 10:
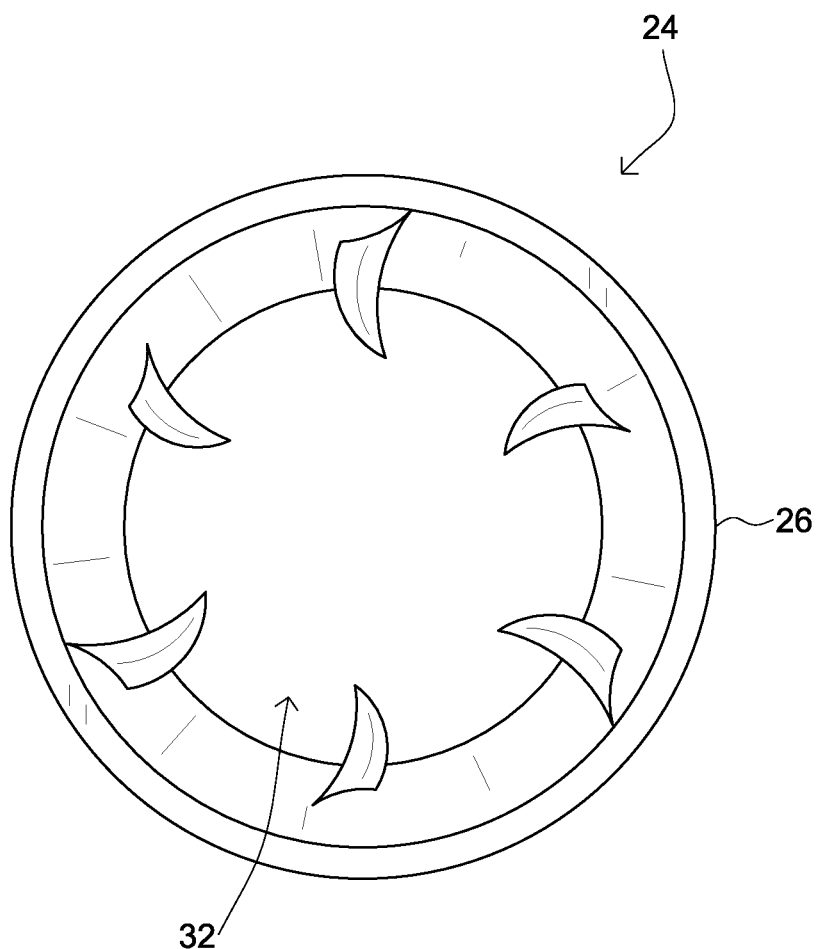
FIG. 10 is a front plan view of a nacelle of a turbofan jet engine, according to one embodiment of the invention.

FIG. 4 is a side elevational view of an airstream contacting a fan blade of a turbofan jet engine, according to one embodiment of the invention. There is shown a turbofan jet engine 10 including an engine core 12 and a nacelle 24. The nacelle includes a forward extension 26 proximate to a fan 14, of the engine core 12, and extending forward therefrom. The forward extension 26 is shaped to impart both radial and angular momentum to intake air during operation. The device/structure for imparting angular momentum is not shown in FIG. 4.

Wherein the forward extension imparts angular momentum to the intake air, there is a vortex about the fan blades. Wherein the forward extension also imparts radial momentum to the intake air, there is a pressurized vortex. The pressurized 5 vortex is generated in a manner and using shapes configured and adapted through experimentation and modeling to angle the intake air to strike, in a more perpendicular manner than would otherwise occur, a fan blade 33 or fan blades of the engine core 12. In particular, the angular momentum is in a direction similar to that of the intended rotation of the fan.

A vortex has reduced pressure and fluid velocity in the center and increased pressure and fluid velocity away from the center. Accordingly, the pressurized vortex is believed to have further increased pressures away from the center and therefore.

It is believed that the more perpendicular contact between the intake air and the fan blade/blades 33, especially about the outer edges of the fan blades that are adjacent 15 the interior surface of the nacelle, more effectively transfers momentum from the intake air to the fan blades and thereby enhances the efficiency of the same and therefore the efficiency of the entire engine. It is believed that the enhanced (doubly so) density of air about the fan blades concentrates the momentum from the intake air about the portion of highest leverage about the fan and therefore provides greater power and a better energy 20 transfer to the same.

In one embodiment, the fan blade/blades are shortened to create a space between the housing at the blade edges to increase the effective surface area of the vortex, especially about the region of the fan blades having the greatest leverage about the fan axis of rotation. In one embodiment there may be a space between the tips of the fan blades that is between about 2, 4, 5, 8, 10, 12, 15, 20, 25, or 28 percent and about 2, 4, 5, 8, 10, 12, 15, 20, 25, or 28 percent of the total distance between the rotational axis of the fan and the edge of the engine housing, or of the total area of the plane defined by the fan within the engine housing. In one embodiment, there may be a space between the tips of the fan blades that is between about 30, 40, 50, 60, 70, 80, 90, 100, 110, 120, 130, 140, or 150 percent and about 30, 40, 50, 60, 70, 80, 90, 100, 110, 120, 130, 140, or 150 percent of the width of a fan blade.

FIGS. 5-8 are front plan views of a nacelle of a turbofan jet engine, according to one embodiment of the invention. There is shown a nacelle 24 including a forward extension 26. The forward extension 26 is shaped to impart radial momentum to intake air during operation. The forward extension 26 includes a vortex device 32 disposed inside the forward extension and shaped to impart angular momentum to intake air. The vortex device 32 is configured to create greater angular intake air velocity as the intake air travels through the forward extension 26. The vortex device 32 is configured to direct intake air towards the fan of the engine core, wherein the intake air contacts the fan blade/blades of the fan more perpendicularly.

The illustrated vortex devices 32 of FIGS. 5-8 are shaped and positioned to generate a vortex inside the nacelle during flight. In particular, the protrusions, blades, extensions, and the like of the illustrated vortex devices channel intake air and impart angular velocity to the same. In conjunction with the narrowing nacelle, the vortex devices create a pressurized vortex within the nacelle that reaches its highest pressures and velocities at the space just adjacent and about the front fan of the engine. The illustrated vortex devices are prophetic exemplary structures that include slanted/curved surfaces that contact the intake air and redirect the same so that the intake velocity of the intake air is altered to have an angular and/or radial component that it may not have previously had. The vortex devices may be shaped and positioned with other factors in mind, including maximizing vortex generation while minimizing resistance or other undesired effects. It is understood that fluid dynamics for jet engines varies by speed, especially at and around the threshold of Mach 1. Accordingly, vortex devices may be of various shapes, sizes, positions for various engines that are optimized for particular speeds and other flight dynamics.

While particular channel directions, sizes, configurations and the like are illustrated among vortex devices and nacelles, it is understood that other channel directions, sizes, shapes, and configurations of vortex devices and nacelles fall within the purview of the invention and that combinations of the same may also be employed to varying degrees and effects.

In one embodiment of the invention, there is a vortex device that includes a channel through a nacelle body, wherein the channel includes an inlet and an outlet and the channel between is shaped and positioned such that air from the inlet is expelled through the outlet with increased angular and/or radial velocity to that received through the inlet. It may be that the channel spirals down a portion of the body of the nacelle. It may be that an outlet is disposed adjacent the fan near the ends of the fan blades, and/or it may be that an outlet is oriented and shaped such that air that is expelled through the outlet strikes fan blades more perpendicularly.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a vortex device including blades, one skilled in the art would appreciate that the blades of the vortex device may vary in size, shape, design, configuration, length, height, width, weight, etc., and still perform its intended function.

Additionally, although the figures illustrate a vortex device including fins, one skilled in the art would appreciate that the fins of the vortex device may vary in size, shape, design, configuration, length, height, width, weight, etc., and still perform its intended function.

It is envisioned that the components of the device may be constructed of a variety of materials, such as but not limited to: metals, metal alloys, plastic, plastic composites, carbon fiber, rubber, rubber composite, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A turbofan jet engine comprising:
   a) an engine core including:
      a1) a fan having an intended rotation direction;
      a2) a compressor in fluid communication with the fan;
      a3) a combustion chamber in fluid communication with the compressor;
      a4) a turbine in fluid communication with the combustion chamber and functionally coupled to the compressor; and
      a5) a nozzle in fluid communication with the turbine; and
   b) a nacelle including:
      b1) a forward extension proximate the fan and extending forward therefrom, and shaped to impart radial momentum to intake air during operation; and
      b2) a vortex device disposed inside the forward extension and shaped to impart angular momentum to intake air wherein the shape imparts angular momentum to intake air in the same direction as the intended rotation of the fan.

2. The engine of claim 1, wherein the forward extension is funnel shaped.

3. The engine of claim 1, wherein the vortex device includes a fixed blade extending from the interior of the forward extension and set at a rotational angle.

4. The engine of claim 1, wherein the vortex device comprises a twisted fin extending across the forward extension.

5. The engine of claim 1, wherein the vortex device includes an air channel disposed through the forward extension and set at a rotational angle.

6. The engine of claim 1, wherein the vortex device is shaped and positioned to direct intake air substantially perpendicular to the blades of the fan.

7. A turbofan jet engine nacelle, comprising: a) an engine core including: a1) a fan; a2) a compressor in fluid communication with the fan; a3) a combustion chamber in fluid communication with the compressor; a4) a turbine in fluid communication with the combustion chamber and functionally coupled to the compressor; and a5) a nozzle in fluid communication with the turbine; and b) a nacelle including a forward extension proximate the fan and extending forward therefrom, and shaped to impart radial momentum to intake air during operation wherein the shape imparts angular momentum to intake air in the same direction as the intended rotation of the fan.

8. The nacelle of claim 7 further comprising a vortex device disposed inside the forward extension and shaped to impart angular momentum to intake air.

9. The engine of claim 8, wherein the forward extension is funnel shaped.

10. The engine of claim 9, wherein the vortex device includes a fixed blade extending from the interior of the forward extension and set at a rotational angle.

11. The engine of claim 10, wherein the vortex device comprises a twisted fin extending across the forward extension.

12. The engine of claim 11, wherein the vortex device includes an air channel disposed through the forward extension and set at a rotational angle.

13. The engine of claim 12, wherein the vortex device is shaped and positioned to direct intake air substantially perpendicular to the blades of the fan.

14. A turbofan jet engine nacelle, comprising: a) an engine core including: a1) a fan; a2) a compressor in fluid communication with the fan; a3) a combustion chamber in fluid communication with the compressor; a4) a turbine in fluid communication with the combustion chamber and functionally coupled to the compressor; and a5) a nozzle in fluid communication with the turbine; and b) a nacelle including: b1) a forward extension proximate the fan and extending forward therefrom, and shaped to impart radial momentum to intake air during operation; and b2) a vortex device disposed inside the forward extension and shaped to impart angular momentum to intake air wherein the shape imparts angular momentum to intake air in the same direction as the intended rotation of the fan.

15. The engine of claim 14, wherein the forward extension is funnel shaped.

16. The engine of claim 15, wherein the vortex device includes a fixed blade extending from the interior of the forward extension and set at a rotational angle.

17. The engine of claim 16, wherein the vortex device comprises a twisted fin extending across the forward extension.

18. The engine of claim 17, wherein the vortex device includes an air channel disposed through the forward extension and set at a rotational angle.

19. The engine of claim 18, wherein the vortex device is shaped and positioned to direct intake air substantially perpendicular to the blades of the fan.

\* \* \* \* \*